US009483698B2

(12) United States Patent
Tsai et al.

(10) Patent No.: US 9,483,698 B2
(45) Date of Patent: Nov. 1, 2016

(54) METHOD OF OPERATING THREE-DIMENSIONAL VIDEO SURVEILLANCE SYSTEM

(71) Applicant: Huper Laboratories Co., Ltd., Taipei (TW)

(72) Inventors: Chih-Hsiang Tsai, Changhua County (TW); Chao-Ming Wang, Taipei (TW)

(73) Assignee: Huper Laboratories Co., Ltd., Taipei (TW)

( * ) Notice: Subject to any disclaimer, the term of this patent is extended or adjusted under 35 U.S.C. 154(b) by 24 days.

(21) Appl. No.: 14/452,533

(22) Filed: Aug. 6, 2014

(65) Prior Publication Data

US 2015/0043777 A1    Feb. 12, 2015

(30) Foreign Application Priority Data

Aug. 8, 2013 (TW) ............................. 102128505 A (51) Int. Cl.
  *G06K 9/00* (2006.01)
  *G06T 7/20* (2006.01)
  *G08B 13/196* (2006.01)
(52) U.S. Cl.
  CPC ....... *G06K 9/00771* (2013.01); *G06K 9/00201* (2013.01); *G06K 9/00362* (2013.01); *G06T 7/20* (2013.01); *G06T 2207/10021* (2013.01); *G06T 2207/10028* (2013.01); *G06T 2207/30196* (2013.01); *G06T 2207/30232* (2013.01); *G08B 13/19606* (2013.01); *G08B 13/19613* (2013.01); *G08B 13/19652* (2013.01)
(58) Field of Classification Search
  None
  See application file for complete search history.

(56) References Cited

U.S. PATENT DOCUMENTS

2013/0148845 A1    6/2013    Maeda

FOREIGN PATENT DOCUMENTS

| TW | 200951777 | 12/2009 |
| TW | 201025193 | 7/2010 |
| TW | 201215093 | 4/2012 |
| TW | 201241547 | 10/2012 |
| TW | 201317902 | 5/2013 |

OTHER PUBLICATIONS

Nguyen, Thien-Nghia, et al. "Stereo-camera-based urban environment perception using occupancy grid and object tracking." Intelligent Transportation Systems, IEEE Transactions on 13.1 (2012): 154-165.*
Dan, Byoung-Kyu, et al. "Robust people counting system based on sensor fusion." Consumer Electronics, IEEE Transactions on 58.3 (2012): 1013-1021.*

* cited by examiner

*Primary Examiner* — Nirav G Patel
(74) *Attorney, Agent, or Firm* — Winston Hsu; Scott Margo (57) ABSTRACT

A method includes generating a disparity map according to two sets of image data, identifying at least one object in the disparity map, mapping the at least one object onto a plane view, tracking at least one object on the plane view, and providing a robust algorithm about a cross-line time interval and a cross-line degree. The robust algorithm includes detecting whether the at least one object enters a predetermined region when the at least one object crosses a predetermined boundary.

6 Claims, 7 Drawing Sheets

METHOD OF OPERATING THREE-DIMENSIONAL VIDEO SURVEILLANCE SYSTEM

CROSS-REFERENCE TO RELATED APPLICATIONS

This application claims priority to Taiwan Patent Application No. 102128505, filed Aug. 8, 2013, now Taiwan Patent No. 1508027, and included herein by reference in its entirety.

BACKGROUND OF THE INVENTION

1. Field of the Invention

The present invention refers to a three dimensional detecting device, and more particularly, a three dimensional detecting device which uses optical parallax of an object to calculate the depth of the object.

2. Description of the Prior Art

Video surveillance systems are presently used as part of the security system of buildings and stores, and also for other observational applications. A video surveillance system may be adopted by a complex area to reduce the man power needed for monitoring. However, if a video surveillance system only uses a single two dimensional (2D) camera for image detection, the system is vulnerable to visual errors caused by lighting and the shadow of the object. An object that may not actually be within the detected area may be perceived to have entered the detected area.

Figure 1:
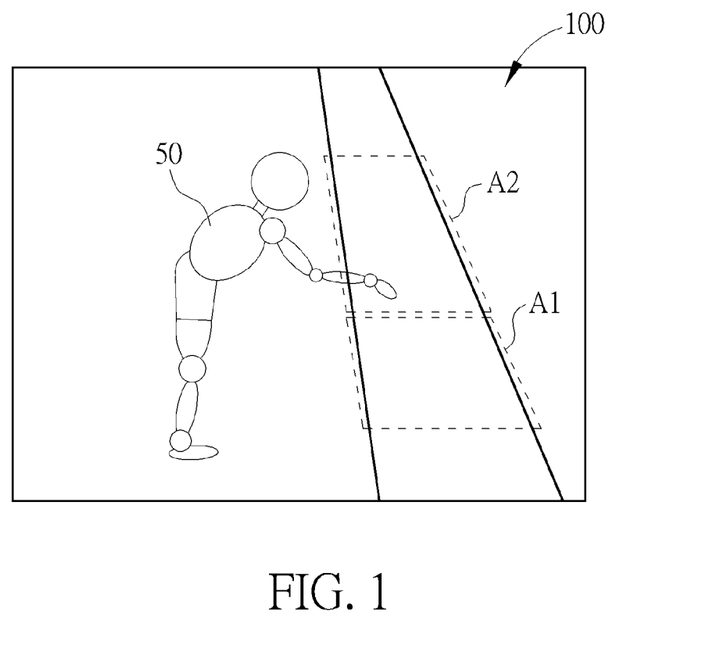
FIG. 1 illustrates a footage taken from a video surveillance camera of a video surveillance system according to prior art.

Please refer to FIG. 1. FIG. 1 is a footage 100 taken from a video surveillance camera of a video surveillance system based on prior art. In the footage 100, a person 50 bent over near an object area A1 and did not actually touch an object area A2. But because the footage 100 is only showing a 2D image, the video surveillance camera may generate a false positive as having person 50 touching the object area A2. This will cause a reduction in the accuracy of the video surveillance system.

SUMMARY OF THE INVENTION

An embodiment of the present invention discloses a method for detecting images using a three dimensional detecting device. The method of detecting comprises generating a disparity map according to two sets of image data, identifying at least one object in the disparity map, mapping the at least one object onto a plane view, tracking the at least one object on the plane view, and determining the at least one object has intruded a predetermined region when a condition of the at least one object on the plane view satisfies a predetermined criterion.

Another embodiment of the present invention discloses a method for detecting images with a three dimensional detecting device. The method of detecting comprises generating a disparity map according to two sets of image data; identifying at least one object in the disparity map; mapping the at least one object onto a plane view, wherein the plane view has a three dimensional section of interest, a bottom area of the section of interest is enclosed by an artificial boundary and a physical boundary, the section of interest comprises a plurality of sub-sections each having cross-sectional areas substantially identical to the bottom area, and a sum of heights of the sub-sections is equal to a height of the section of interest; tracking the at least one object in the plane view to identify a height of each of the at least one object; and when detecting an object of the at least one object has crossed the artificial boundary, comparing a height of the object with at least one height range of at least one sub-section of the section of interest, and determining if the object has crossed a surface of each of the at least one sub-section according to a comparison result.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
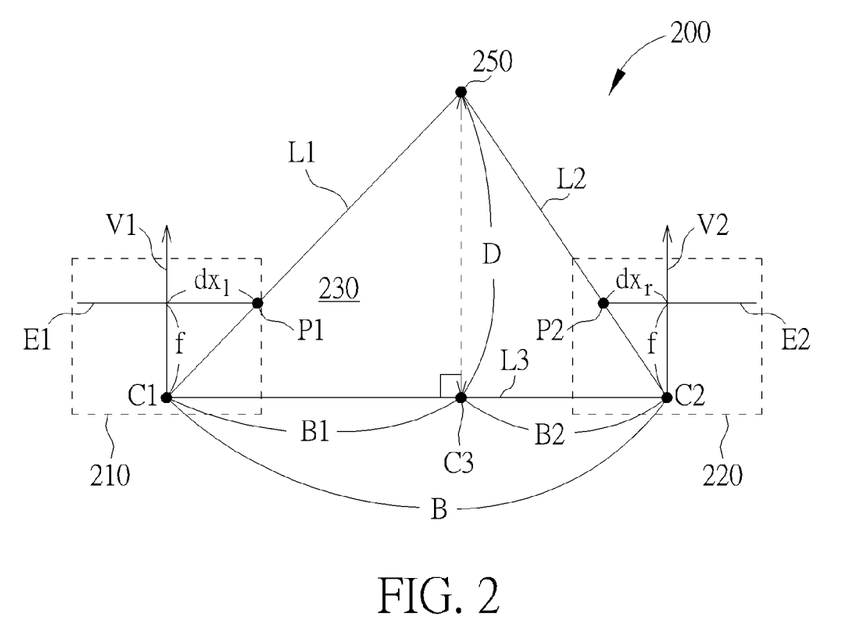
FIG. 2 illustrates a three dimensional detecting device camera arrangement according to one embodiment of present invention.

Please refer to FIG. 2. FIG. 2 illustrates a three dimensional detecting device 200 camera arrangement according to one embodiment of present invention. In reference to FIG. 2, the three dimensional detecting device 200 comprises a left camera 210 and a right camera 220 applied for the detection of an object 250. The left camera 210 includes a projection center C1 and an image plane E1. The right camera 220 includes a projection center C2 and an image plane E2. The image plane E1 and the image plane E2 are in parallel with a path L3 that goes from the projection center C1 to the projection center C2 with a distance B. The projection center C1, projection center C2 and object 250 shall form an area of a triangle 230. A depth D of the object 250 is the distance of the object 250 perpendicular to the path L3. The perpendicular point of the object 250 to the path L3 is taken as a starting point C3. The starting point C3 is not limited to being located at the center of projection center C1 and projection center C2. If a distance B1 is taken as the distance between the projection center C1 and starting point C3 and a distance B2 is taken as the distance between the projection center C2 and starting point C3, then distance B1 is not necessarily equal to distance B2. A path L1 is the path between projection center C1 and the object 250 and an intersection point P1 is the intersection point of image plane E1 and path L1. A path L2 is the path between the projection center C2 and the object 250 and an intersection point P2 is the intersection point of the image plane E2 and path L2. A distance f is the distance between the image plane E1 and path L3 and is the same distance value for image plane E2 and path L3. A distance dxl is the distance between an optical axis V1 of the left camera 210 and the intersection point P1. And a distance dxr is the distance between an optical axis V2 of the right camera 220 and the intersection point P2. They are related as follows:

$$\frac{D}{B1} = \frac{f}{dx_l} \quad (1)$$

$$\frac{D}{B2} = \frac{f}{dx_r} \quad (2)$$

From equation (1) and (2), it follows that:

$$D = (B1 + B2) \times \frac{f}{(dx_l + dx_r)} = B \times \frac{f}{(dx_l + dx_r)} \quad (3)$$

The depth D of the object 250 can be derived by using equation (3). Therefore, the miscalculation of the position of target object based on 2D detection device can be avoided. The three dimensional detecting device 200 may use the left camera 210 and the right camera 220 to continuously detect the object 250 even when it is on the move. The invention includes a processor that uses the gathered information of the left camera 210 and the right camera 220 to calculate the movement of the object 250 based on a 3D space.

Figure 3:
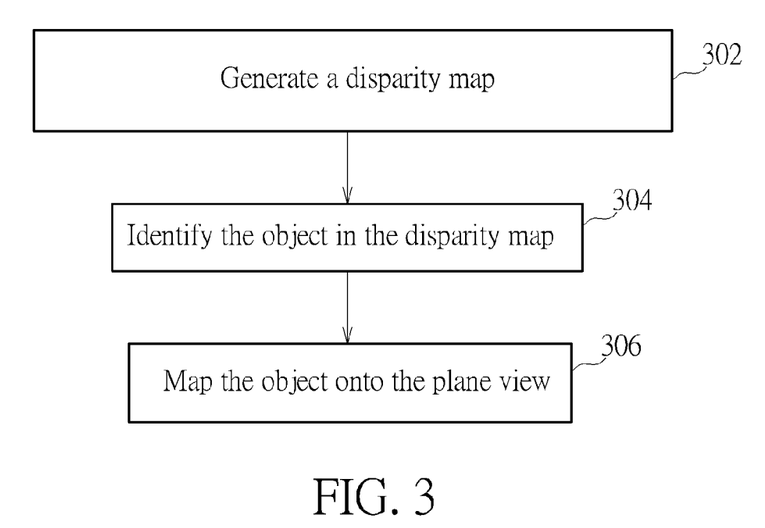
FIG. 3 illustrates a flowchart disclosing a method of detecting an object of the three dimensional detecting device shown in FIG.
Figure 4:
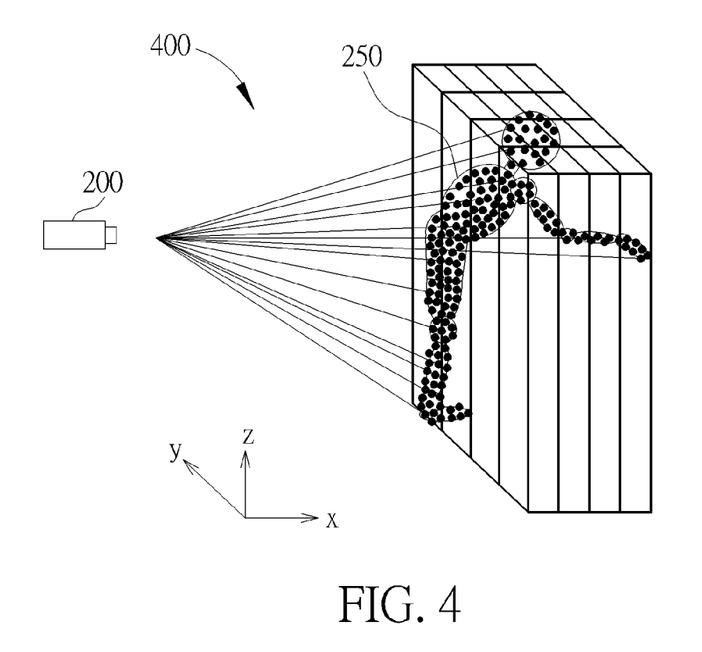
FIG. 4 illustrates a disparity map generated by the three dimensional detecting device shown in FIG. 2 through the flowchart shown in FIG. 3.
Figure 5:
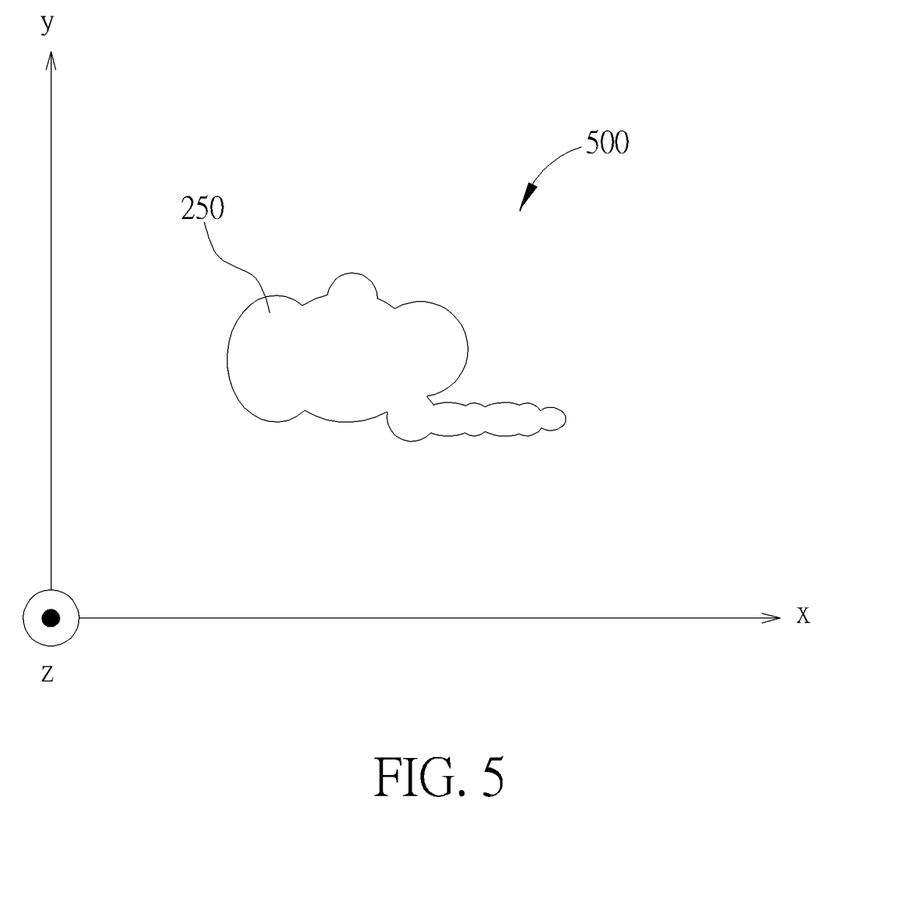
FIG. 5 illustrates a plane view generated by the three dimensional detecting device shown in FIG. 2 through the flowchart shown in FIG. 3.

Please refer to FIGS. 3-5. FIG. 3 illustrates a flowchart disclosing a method of detection of the object 250 of the three dimensional detecting device 200 shown in FIG. 2. FIG. 4 is a disparity map 400 generated by the three dimensional detecting device 200 through the flowchart in FIG. 3. FIG. 5 is a plane view 500 generated by the three dimensional detecting device 200 through the flowchart in FIG. 3. The steps included in the flowchart on FIG. 3 are as follows:

Step 302: Generate a disparity map 400 according to two sets of image data captured by the camera 210 and the camera 220 from an object 250;

Step 304: Identify the object 250 in the disparity map 400;

Step 306: Map the object 250 onto the plane view 500.

According to step 302 to 306, the object 250 can be a body of a person, as shown in FIG. 4, or other objects. The present invention is able to detect one or more objects. That is, the three dimensional detecting device 200 can simultaneously detect a plurality of objects. The disparity map 400 contains a plurality of points of the object 250 each have three coordinates in 3D space. An outline of the object 250 shown in the plane view 500 is generated using the plurality of points of the object 250 from the disparity map 400. Using the plane view 500, a planar location of the object 250 is clearly extracted. By using the three dimensional detecting device 200, a user is able to immediately collect a planar information of the object 250. The outline shown on the plane view 500 generated from the object 250 is not limited to the top view of the object 250. The outline of the object 250 at any elevation level can be extracted from the disparity map 400 and be formed on the plane view 500.

Figure 6:
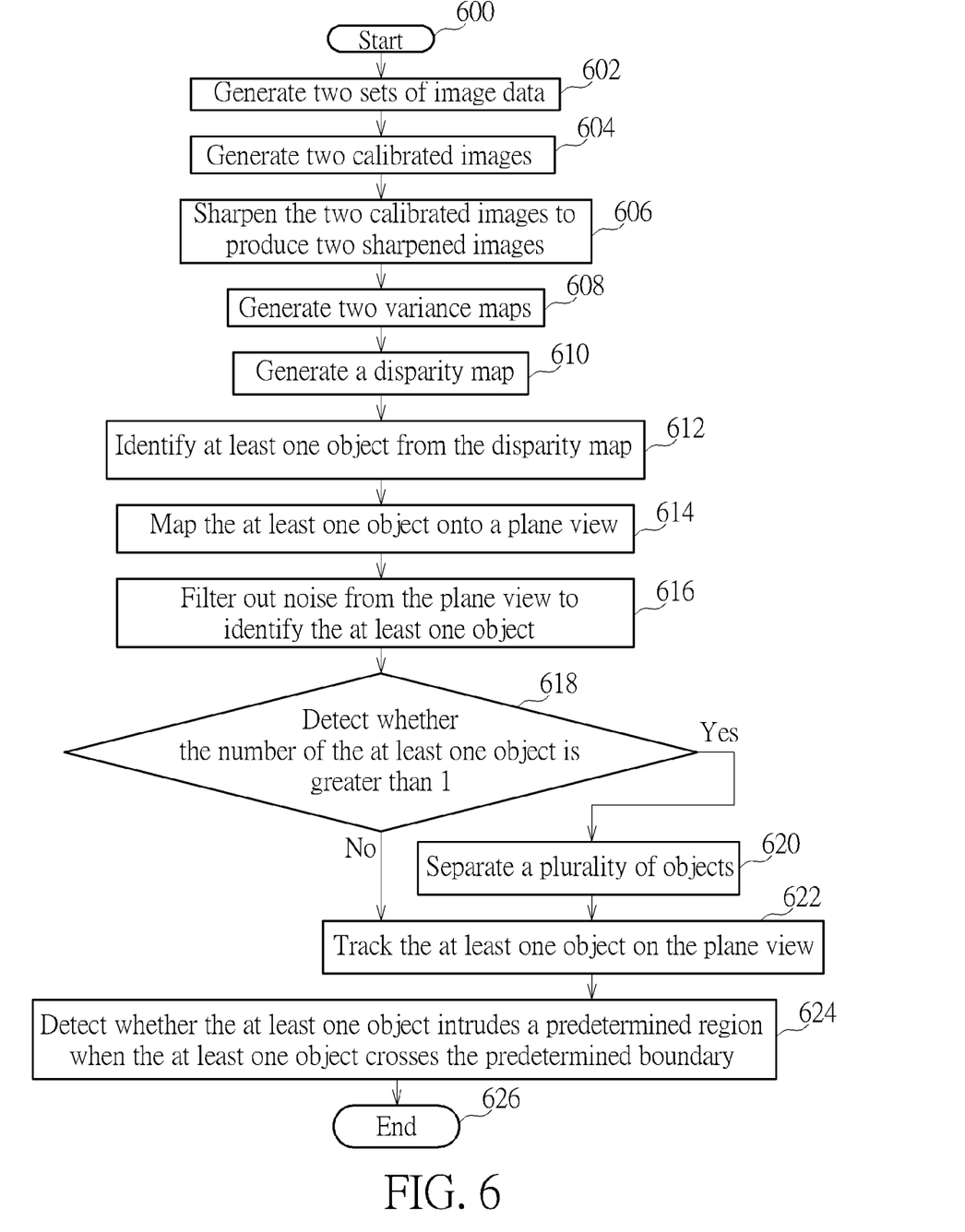
FIG. 6 illustrates a flowchart disclosing a method of calculation for the number of times the object crosses the predetermined boundary shown in FIG. 2.

Please refer to FIG. 6. FIG. 6 is a flowchart disclosing a method of calculation for the number of times the object 250 crosses a predetermined boundary. The method of calculation comprises:

Step 600: Start;
Step 602: Use the left camera 210 and the right camera 220 to generate two sets of image data;
Step 604: Generate two calibrated images from the two sets of image data according to calibrated data received beforehand;
Step 606: Sharpen the two calibrated images to produce two sharpened images;
Step 608: Use the two sharpened images to generate two variance maps;
Step 610: Generate a disparity map using the two sharpened images and the two variance maps;
Step 612: Identify at least one object from the disparity map;
Step 614: Map the at least one object onto a plane view;
Step 616: Filter out noise from the plane view to identify the at least one object;
Step 618: Detect whether the number of the at least one object is greater than 1; if so, perform step 620; else, skip to step 622;
Step 620: Separate a plurality of objects;
Step 622: Track the at least one object on the plane view;
Step 624: detect whether the at least one object intrudes a predetermined region when the at least one object crosses the predetermined boundary;
Step 626: End.

Step 604 to step 608 are pre-processing steps performed to optimize quality of the two sets of image data of which includes adjustment of brightness of image and image noise filtering. The calibrated data in step 604 is defined using the three dimensional detecting device 200 by adjusting the left camera 210 and the right camera 220 in reference to a reference object. The calibration of data includes calibration of an angle, a focal length and an imaging center. The two sharpened images from step 606 and the two variance maps from step 608 are used to generate a disparity map in step 610. The two variance maps are calculated based on differences of each pixel and surrounding environment. The variance maps have a higher value when there is a large amount of color difference, i.e. a floral shirt. The variance maps have a lower value when there is a smaller amount of color difference, i.e. a white wall. According to the method of detection of the three dimensional detecting device 200, at least one object is mapped onto the plane view in step 612 and step 614. The method of detection comprises defining the disparity map, identifying the at least one object through the disparity map, and mapping the at least one object onto the plane view so that when an object intrudes the predetermined region, the intrusion of the object can be identified.

Figure 7:
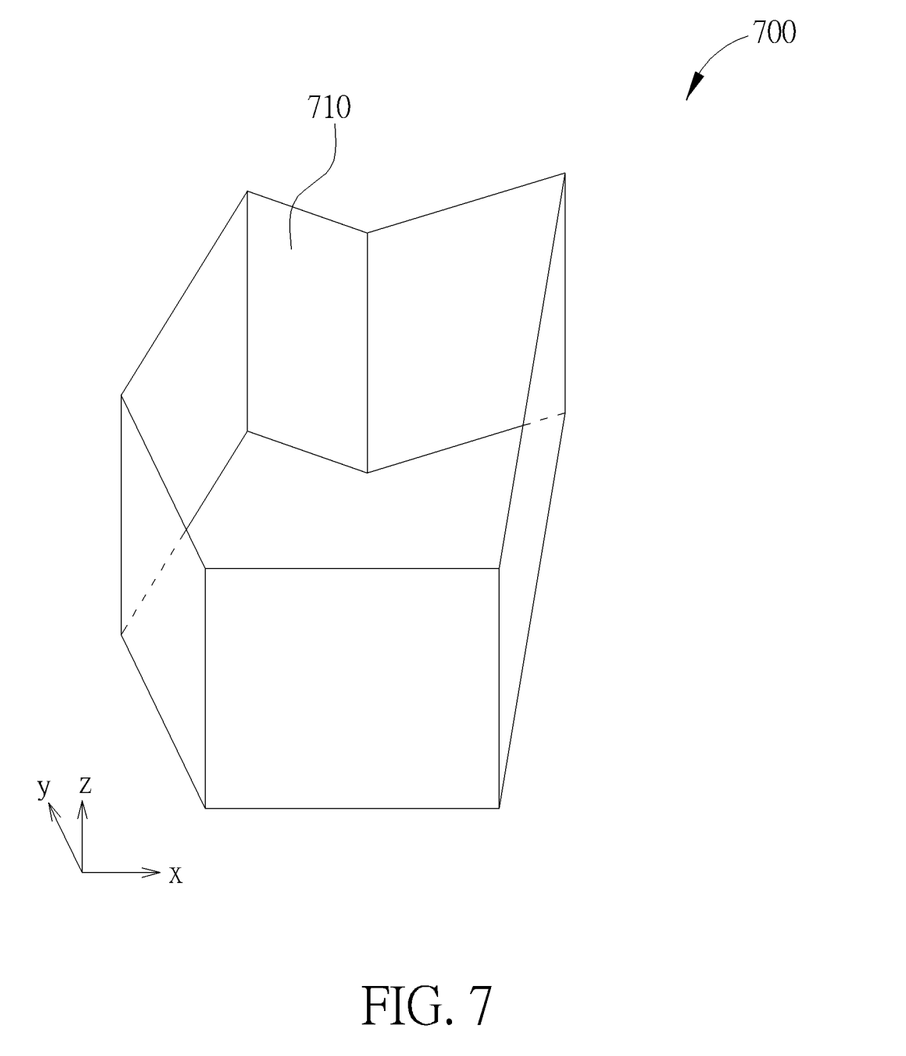
FIG. 7 illustrates an area of interest of the three dimensional detection device shown in FIG. 2.

Please refer to FIG. 7. FIG. 7 illustrates an area of interest 700 monitored by the three dimensional detecting device 200. The area of interest 700 is enclosed by a plurality of surfaces 710. The sizes and the positions of the plurality of surfaces 710 are defined according to specific needs. An object crossing one of the surfaces 710 may be determined to be intruding the area of interest 700. A bottom of the plurality of surfaces 710 is determined by an artificial boundary and a physical boundary. The three dimensional detecting device 200 is used to detect if the object has intruded the area of interest 700.

In step 624, the at least one object is determined to have intruded the predetermined region when the at least one object crosses the predetermined boundary of the predetermined region by at least a predetermined distance, the at least one object crosses the predetermined boundary for a predetermined period of time and/or the at least one object crosses the predetermined boundary at a height within a predetermined height range. When a portion of an object has crossed the predetermined boundary, a ratio of the portion of the object crossing the predetermined boundary to the object can be compared with a ratio threshold to determine if the object has intruded the predetermined region. When an object has crossed the predetermined boundary, the period of time the object crossed the predetermined boundary can be compared with the predetermined period of time to determine if the object has intruded the predetermined region. Further, when an object has crossed the predetermined boundary, the height at which the object crossed the predetermined boundary can be compared with a predetermined height range to determine if the object has intruded the predetermined region. The three dimensional detecting device 200 can also be used to detect whether an object intruded the predetermined region has left the predetermined region. When the intruded object moves from inside the predetermined region towards outside the predetermined region, a distance the object crosses the predetermined boundary, a period of time the object crosses the predetermined boundary and/or a height at which the object crosses the predetermined boundary can be compared with respective thresholds to determine if the intruded object has left the predetermined region.

In an embodiment of the present invention, an object may cross the predetermined boundary at two or more different heights. The heights at which the object crosses the predetermined boundary and the proportions of the object crossing the predetermined boundary through the heights will be detected. The proportion of the object crossing the predetermined boundary through each height range can be compared with a ratio threshold to determine if the object has intruded the predetermined region through the height range. For instance, when a person in a store crosses the predetermined boundary to touch different products at different height ranges, the proportions of the object crossing the predetermined boundary through the different height ranges will be compared with respective ratio thresholds to determine which of the height ranges was the object intruding through.

Figure 8:
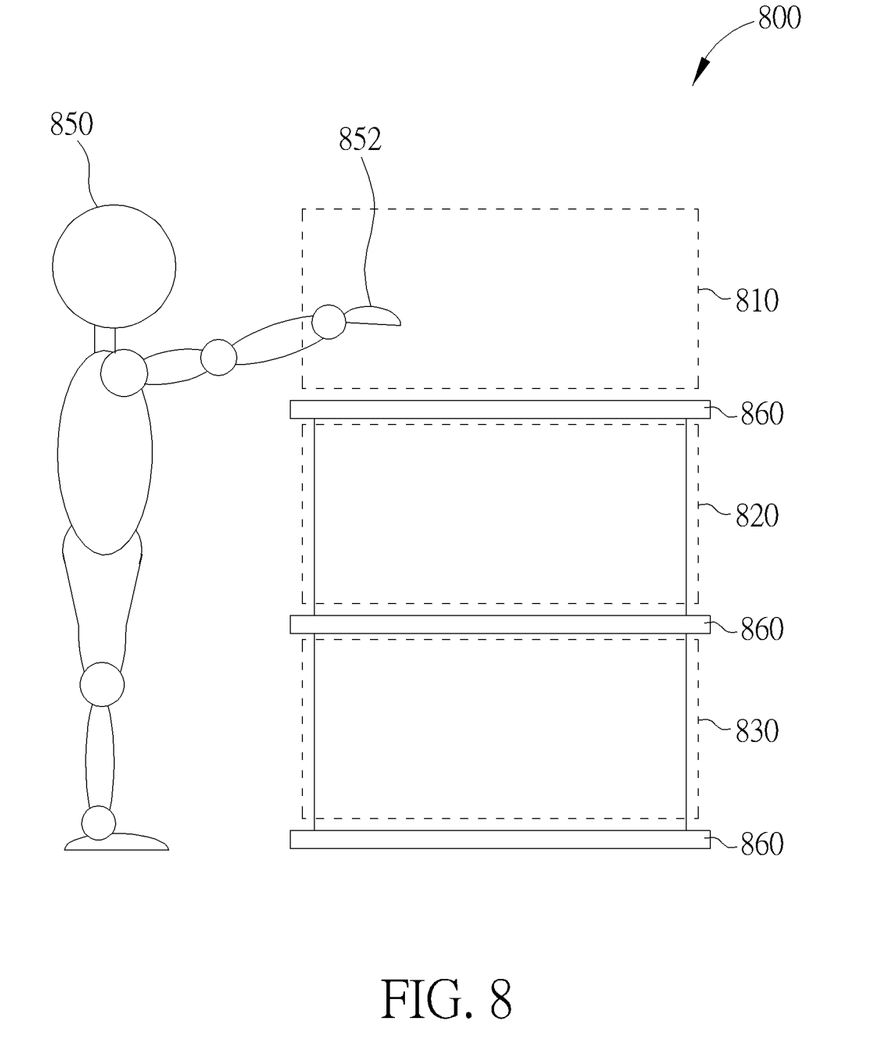
FIG. 8 illustrates a footage of an intrusion taken from the three dimensional detection device shown in FIG. 2.

Please refer to FIG. 8. FIG. 8 illustrates footage of an intrusion taken by the three dimensional detecting device 200. A shelf 800 contains a plurality of shelf boards 860 separating the shelf 800 into a region 810, a region 820 and a region 830. A user 850 uses a hand 852 to pick up an item from the shelf 800. Using step 610 to step 614, disparity maps corresponding to the user 850 for a plurality of sub-sections can be generated. The height of the hand 852 of the user 850 can then be determined and the three dimensional detecting device 200 can determine which of the regions 810 to 830 the intrusion has occurred.

Figure 9:
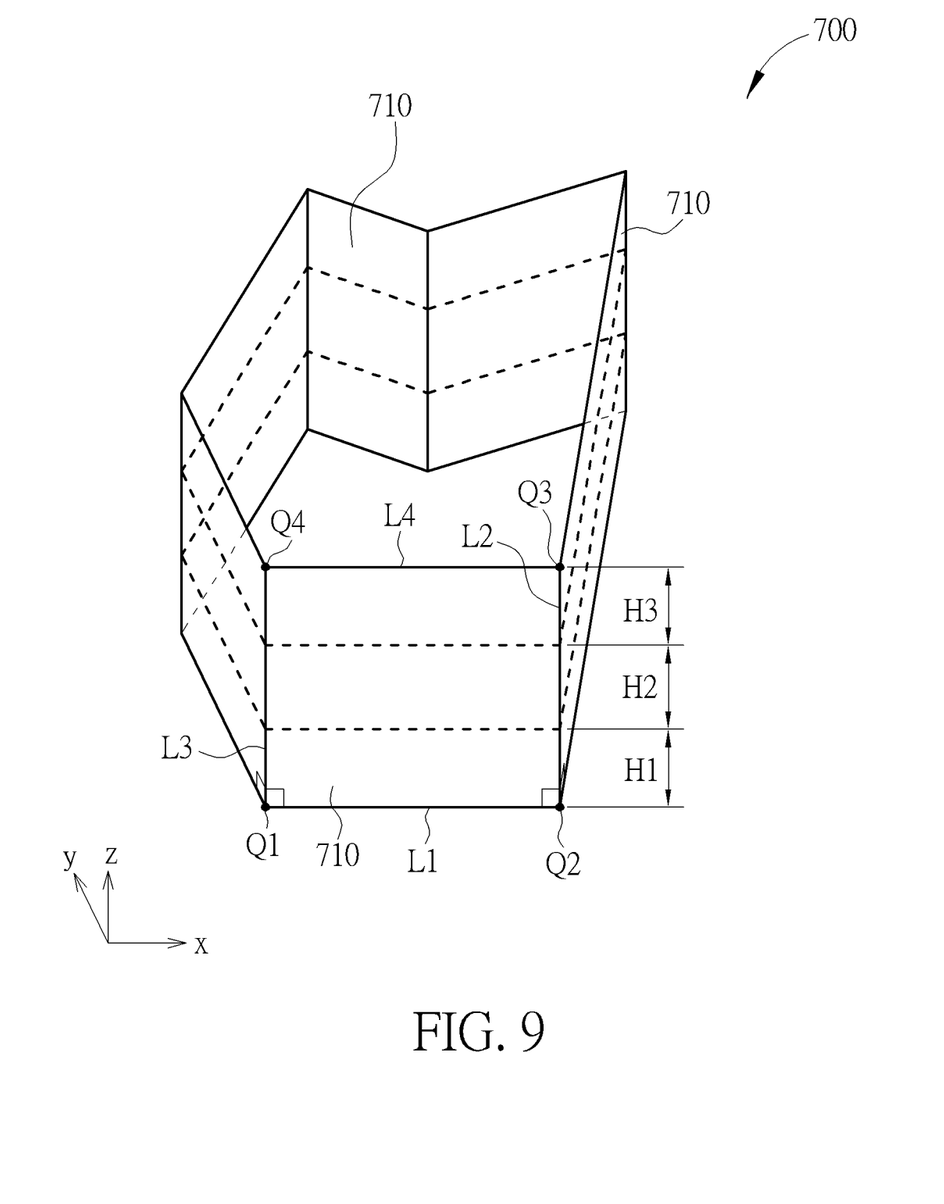
FIG. 9 illustrates the area of interest shown in FIG. 7 partitioned into sub-sections to implement detection of intrusion.

As shown in FIG. 8, the shelf boards 860 are used as a basis to divide the shelf 800 into the plurality of sub-sections used for detection of intrusion. Please refer to FIG. 9. FIG. 9 illustrates the area of interest 700 of FIG. 7 equally partitioned to a plurality of sub-sections to implement detection of intrusion. The plurality of surfaces 710 defined in the area of interest 700 has a detection line L1 on the ground which is the line between a vertex Q1 and a vertex Q2. And also include a vector line L2 which is the line between the vertex Q2 and a vertex Q3, a vector line L3 which is the line between the vertex Q1 and a vertex Q4 and a detection line L4 which is the line between the vertex Q3 and the vertex Q4. The vertex Q3 and the vertex Q4 have a same height. The vertex Q3 and the vertex Q4 define a detection height limit of the three dimensional detecting device 200. The vertex Q1, the vertex Q2, the vertex Q3 and the vertex Q4 define a surface of the plurality of surfaces 710.

In order for the three dimensional detecting device 200 to detect different height ranges, the plurality of surfaces 710 are divided into a plurality of sub-sections H1, H2 and H3. The sub-section H1 represents the bottom sub-section of the plurality of surfaces 710. The sub-section H3 represents the top sub-section of the plurality of surfaces 710. Note that setting of detection of the sub-section H1, the sub-section H2, and the sub-section H3 can be set by default or be user defined. Number of sub-sections of the embodiment is not limited to the illustration in FIG. 9.

The three dimensional detecting device 200 can detect which of the sub-sections has been broken into, the direction of break in, the direction of retreat, and if an intrusion has actually occurred. Because the three dimensional detecting device 200 can detect incidents at different sub-sections H1, H2, H3, an object crossing two or more sub-sections H1, H2, H3 can be identified to determine which height ranges have been crossed by the object. When an object crosses two sub-sections H2, H3 at the same time, the three dimensional detecting device 200 will generate incident angles of the object at the two sub-sections H2, H3. In the similar manner, the directions of retreats from the two sub-sections H2, H3 can be detected by the three dimensional detecting device 200.

The three dimensional detecting device 200 has a mechanism for detecting the crossing of each of the plurality of sub-sections. Thus detection of sub-sections being crossed can be activated for only part or all of the sub-sections.

The three dimensional detecting device 200 uses the method of calculation shown in FIG. 2 to generate a three dimensional information of at least one object determining whether the at least one object has crossed a predetermined boundary. When the three dimensional detecting device 200 has generated the three dimensional information of the at least one object, the three dimensional information of the at least one object can be compared to information collected from the sub-section H1, the sub-section H2 and the sub-section H3 individually to determine which sub-sections are being crossed, the incident angles of crossing the sub-sections, and which sub-sections are being intruded.

According to the present invention, a method of validation of intrusion of at least one object corresponding to a time, a distance and/or a height the at least one object crosses a predetermined boundary is disclosed. A mechanism for intrusion detection of each of a plurality of sub-section is independent. The sub-section of the at least one object intruding the predetermined boundary is determined with regard to a period of time the at least one object crosses the predetermined boundary, the number of components of the at least one of object crosses the predetermined boundary and/or the proportion of the at least one object crosses the predetermined boundary to the at least one object.

The three dimensional detecting device 200 determines at least one sub-section to perform detection. The three dimensional detecting device 200 uses a set of thresholds comprising the number of components of an object crossing the predetermined boundary, the proportion of the object crossing the predetermined boundary to the object and/or the period of time the object crosses the predetermined boundary as basis for determining the validity of intrusion of the object. When the object crosses the predetermined boundary, the three dimensional detecting device 200 shall compare the height at which the object crossed the predetermined boundary to a height range of each of the plurality of sub-sections by running the mechanism. A comparative result will show whether the object is intruding in at least one of the sub-sections. Next, the validity of intrusion is determined. The three dimensional detecting device 200 runs the mechanism independently for each of the plurality of sub-sections. Running the mechanism of a sub-section determines the number of components of an object crossing the predetermined boundary, the proportion of the object crossing the predetermined boundary to the object and/or the period of time the object crosses the predetermined boundary. After the mechanism of the sub-section finished running, the validity of intrusion is determined. The three dimensional detecting device 200 determines the validity of intrusion according to if the number of components of the object crossing the predetermined boundary is greater than a threshold number, the proportion of the object crossing the predetermined boundary to the object is greater than a threshold percentage and/or the period of time the at least one object crosses the predetermined boundary is higher than a threshold period of time. The validation process can increase accuracy of detection and filter out some unintended intrusion in different sub-sections.

The present invention discloses a three dimensional detection device. The embodiment of present invention shown in FIGS. 2-5 discloses the method of determining the disparity map and the height information for the at least one object. The embodiment of the present invention shown in FIGS. 6-9 discloses a method of determining the occurrences of crossing the predetermined boundary, the height information and the position of intrusion of the at least one object. Therefore, according to the present invention, the height and the position of the at least one object can be correctly determined. As compared to prior art that only uses a single camera, the present invention has improved the accuracy by improving vulnerability of the prior art to changes in light and shadow.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of video surveillance, the method comprising:
    generating a disparity map according to two sets of image data captured using a left camera and a right camera;
    identifying at least one object in the disparity map;
    mapping the at least one object onto a plane view, wherein the plane view has a three dimensional section of interest, a bottom area of the section of interest is enclosed by an artificial boundary and a physical boundary, the section of interest comprises a plurality of sub-sections each having cross-sectional areas identical to the bottom area, and a sum of heights of the sub-sections is equal to a height of the section of interest;
    tracking the at least one object in the plane view to identify a height of each of the at least one object;
    when detecting an object of the at least one object has crossed the artificial boundary, comparing a height of the object with at least one height range of at least one sub-section of the section of interest, and determining if the object has crossed a surface of each of the at least one sub-section according to a comparison result;
    after determining the object has crossed the surface according to the comparison result, detecting number of components of the object crossing the surface, a direction the object crossing the surface, a ratio of a portion of the object crossing the surface to the object, and/or a period of time the object has crossed the surface;
    comparing the ratio of the portion of the object crossing the surface to the object and a ratio threshold of the sub-section; and
    determining the object has intruded the sub-section when the ratio of the portion of the object crossing the surface to the object is higher than the ratio threshold of the sub-section.

2. The method of claim 1, further comprising:
    after determining the object has intruded the sub-section, detecting a direction the object retreats from the sub-section.

3. A method of a video surveillance, the method comprising:
    generating a disparity map according to two sets of image data captured using a left camera and a right camera;
    identifying at least one object in the disparity map;
    mapping the at least one object onto a plane view, wherein the plane view has a three dimensional section of interest, a bottom area of the section of interest is enclosed by an artificial boundary and a physical boundary, the section of interest comprises a plurality of sub-sections each having cross-sectional areas identical to the bottom area, and a sum of heights of the sub-sections is equal to a height of the section of interest;
    tracking the at least one object in the plane view to identify a height of each of the at least one object;
    when detecting an object of the at least one object has crossed the artificial boundary, comparing a height of the object with at least one height range of at least one sub-section of the section of interest, and determining if the object has crossed a surface of each of the at least one sub-section according to a comparison result;
    after determining the object has crossed the surface according to the comparison result, detecting number of components of the object crossing the surface, a direction the object crossing the surface, a ratio of a portion of the object crossing the surface to the object, and/or a period of time the object has crossed the surface;
    comparing a period of time the object has crossed the surface and a time threshold of the sub-section; and
    determining the object has intruded the sub-section when the period of time the object has crossed the surface is longer than the time threshold of the sub-section.

4. The method of claim 3, further comprising:
    after determining the object has intruded the sub-section, detecting a direction the object retreats from the sub-section.

5. A method of video surveillance, the method comprising:
    generating a disparity map according to two sets of image data captured using a left camera and a right camera;
    identifying at least one object in the disparity map;
    mapping the at least one object onto a plane view, wherein the plane view has a three dimensional section of interest, a bottom area of the section of interest is enclosed by an artificial boundary and a physical boundary, the section of interest comprises a plurality of sub-sections each having cross-sectional areas identical to the bottom area, and a sum of heights of the sub-sections is equal to a height of the section of interest;

tracking the at least one object in the plane view to identify a height of each of the at least one object;

when detecting an object of the at least one object has crossed the artificial boundary, comparing a height of the object with at least one height range of at least one sub-section of the section of interest, and determining if the object has crossed a surface of each of the at least one sub-section according to a comparison result;

after determining the object has crossed the surface according to the comparison result, detecting number of components of the object crossing the surface, a direction the object crossing the surface, a ratio of a portion of the object crossing the surface to the object, and/or a period of time the object has crossed the surface;

comparing number of components of the object crossing the surface and a number threshold of the sub-section; and determining the object has intruded the sub-section when the number of components of the object crossing the surface is larger than the number threshold of the sub-section.

6. The method of claim 5, further comprising:

after determining the object has intruded the sub-section, detecting a direction the object retreats from the sub-section.

\* \* \* \* \*